(12) United States Patent
Lancaster, III et al.

(10) Patent No.: US 12,359,730 B2
(45) Date of Patent: Jul. 15, 2025

(54) STRETCH WRAPPING MACHINE WITH PACKAGING MATERIAL TAIL TREATMENT

(71) Applicant: Lantech.com, LLC, Louisville, KY (US)

(72) Inventors: Patrick R. Lancaster, III, Louisville, KY (US); Jean-Louis Limousin, Louisville, KY (US)

(73) Assignee: Lantech.com, LLC, Louisville, KY (US)

( * ) Notice: Subject to any disclaimer, the term of this patent is extended or adjusted under 35 U.S.C. 154(b) by 22 days.

(21) Appl. No.: 18/473,744

(22) Filed: Sep. 25, 2023

(65) Prior Publication Data

US 2024/0026980 A1    Jan. 25, 2024

Related U.S. Application Data

(62) Division of application No. 17/356,426, filed on Jun. 23, 2021, now Pat. No. 11,794,933.

(60) Provisional application No. 63/048,219, filed on Jul. 6, 2020.

(51) Int. Cl.
*F16K 3/316* (2006.01)
*F16K 3/02* (2006.01)
*F16K 27/04* (2006.01)

(52) U.S. Cl.
CPC .......... *F16K 3/0281* (2013.01); *F16K 3/0227* (2013.01); *F16K 3/0272* (2013.01); *F16K 3/316* (2013.01); *F16K 27/044* (2013.01)

(58) Field of Classification Search
USPC ......................................................... 53/463
See application file for complete search history.

(56) References Cited

U.S. PATENT DOCUMENTS

| 4,152,879 | A |   | 5/1979  | Shulman |
| 4,189,894 | A |   | 2/1980  | Laing |
| 4,355,496 | A |   | 10/1982 | Teates et al. |
| 4,616,474 | A |   | 10/1986 | Morley et al. |
| 4,993,209 | A | * | 2/1991  | Haloila ............... B29C 65/7471 53/399 |

(Continued)

FOREIGN PATENT DOCUMENTS

| AU | 2021306981 A1 | 2/2023 |
| CA |    3185130 A1 | 1/2023 |

(Continued)

OTHER PUBLICATIONS

Robopac USA, Genesis Futura 40 Automation Rotary Ring Stretch Wrapper—Arconvert Customer Plant, Retrieved from:https://www.youtube.com/watch?v=bg1LzR7ZuYc, Dec. 12, 2019.

(Continued)

*Primary Examiner* — Chinyere J Rushing-Tucker
(74) *Attorney, Agent, or Firm* — Gray Ice Higdon

(57) ABSTRACT

A method, apparatus and program product utilize pressurized fluid flow from a position generally upstream of a free end of a packaging material tail and at an acute angle relative to the side of a load while the free end of the packaging material tail is unsupported and/or utilize pressurized fluid flow in two or more directions and from two or more positions to assist in adhering a packaging material tail to the side of a load at the completion of a wrapping operation.

43 Claims, 9 Drawing Sheets

(56) References Cited

U.S. PATENT DOCUMENTS

| | | | |
|---|---|---|---|
| 4,995,224 | A | 2/1991 | Yourgalite et al. |
| 5,005,335 | A | 4/1991 | Yourgalite et al. |
| 6,164,047 | A | 12/2000 | Rossi |
| 6,453,643 | B1 | 9/2002 | Buscherini et al. |
| 6,796,105 | B2 | 9/2004 | Rossi |
| 7,469,520 | B2 | 12/2008 | Lancaster, III et al. |
| 8,099,935 | B2 | 1/2012 | Forni et al. |
| 8,695,312 | B2* | 4/2014 | Johnson ............ B65B 11/045 53/399 |
| 9,290,285 | B2 | 3/2016 | Johnson et al. |
| 10,040,583 | B2 | 8/2018 | Smith et al. |
| 10,604,284 | B2 | 3/2020 | Pierson et al. |
| 11,794,933 | B2 | 10/2023 | Lancaster, III |
| 2003/0093974 | A1 | 5/2003 | Rossi |
| 2007/0157557 | A1 | 7/2007 | Lancaster |
| 2015/0203221 | A1 | 7/2015 | Van De Hey et al. |
| 2018/0162568 | A1 | 6/2018 | Pierson |
| 2022/0002012 | A1* | 1/2022 | Lancaster, III ......... B65B 49/16 |
| 2024/0026980 | A1 | 1/2024 | Lancaster, III et al. |
| 2024/0343437 | A1 | 10/2024 | Limousin |
| 2024/0343438 | A1 | 10/2024 | Limousin |

FOREIGN PATENT DOCUMENTS

| | | |
|---|---|---|
| CN | 208565013 U | 3/2019 |
| DE | 19509649 A1 | 9/1996 |
| EP | 4175882 A1 | 5/2023 |
| WO | 03020591 A1 | 3/2003 |
| WO | 2022010654 A1 | 1/2022 |
| WO | 2022119573 A1 | 6/2022 |
| WO | 2024215501 A2 | 10/2024 |

OTHER PUBLICATIONS

Wulftect, Proven Cut & Wipe Film Treatment System, Retrieved from: https://www.wulftec.com/solutions/film-tail-treatment, Retrieved on Apr. 5, 2021.

Robopac, Turntable Stretch Wrapper Technoplat 3000, Direct Industry, Retrieved from: https://www.directindustry.com/prod/robopac-spa/product-97195-1853168.html, Retrieved on Apr. 5, 2021.

Integrated Machinery, OMS Model AV620 & AV630 Stretch Wrapper, Retrieved from: https://integratedmachinery.com.au/wp-content/uploads/2017/10/OMS_Model_AV620_and_AV630_Automated_Rotary_Arm_Stretch_Wrapper.pdf, Retrieved on Apr. 5, 2021.

International Search Report and Written Opinion issued in PCT Application No. PCT/US2021/038776, dated Sep. 29, 2021, 18 pages.

Australian Government—IP Australia; Examination Report No. 1 issued in Application No. 2021306981 dated Jan. 16, 2024.

Australian Government—IP Australia; Examination Report No. 2 issued in Application No. 2021306981 dated May 17, 2024.

International Search Report and Written Opinion issued in PCT Application No. PCT/US2024/022354, 17 pages, dated Oct. 31, 2024.

European Patent Office, Extended Search Report issued in European Application No. 21836805.8; 6 pages, dated Jul. 2, 2024.

European Patent Office; Communication Pursuant to Rules70(2) and 70a(2); issued in application No. 21836805.8; 1 page; dated Jul. 19, 2024.

* cited by examiner

STRETCH WRAPPING MACHINE WITH PACKAGING MATERIAL TAIL TREATMENT

BACKGROUND OF THE INVENTION

Various packaging techniques have been used to build a load of unit products and subsequently wrap them for transportation, storage, containment and stabilization, protection and waterproofing. One system uses wrapping machines to stretch, dispense, and wrap packaging material around a load. The packaging material may be pre-stretched before it is applied to the load. Wrapping can be performed as an inline, automated packaging technique that dispenses and wraps packaging material in a stretch condition around a load on a pallet to cover and contain the load. Stretch wrapping, whether accomplished by a turntable, rotating arm, vertical rotating ring, or horizontal rotating ring, typically covers the four vertical sides of the load with a stretchable packaging material such as polyethylene packaging material. In each of these arrangements, relative rotation is provided between the load and the packaging material dispenser to wrap packaging material about the sides of the load.

Loads have been wrapped with packaging material by securing a leading end portion of the packaging material to the load or a turntable clamp, dispensing the packaging material, and providing relative rotation between the load and a packaging material dispenser to cause the load to be enveloped by the packaging material. The relative rotation may be provided several different ways. Either the load can be rotated on a turntable, or the dispenser can be rotated around the stationary load. Wrapping usually employs a web of packaging material as the packaging material.

Semi-automatic wrapping machinery generally requires an operator to attach a leading end portion of the packaging material to the load prior to wrapping. This is typically accomplished by collapsing the leading end portion into a rope, then inserting the rope between the layers of the load or tying the end of the packaging material to the edge of the supporting wood pallet or any suitable outcropping on the load. This attachment must be relatively strong since it provides the resistance to pulling the packaging material from the packaging material dispenser during the initiation of the relative rotation between the load and the packaging material dispenser. The attachment or tying of the packaging material makes packaging material removal more difficult after the load has been shipped to its destination.

Automatic wrapping machines typically use packaging material clamps that grip the packaging material web between two opposed surfaces and use electrical or pneumatic actuators to open and close the clamps. Such packaging material clamps may create a "tenting" effect during wrapping due to the distance between the clamp and the load during wrapping, resulting in wasted packaging material and loosely wrapped loads. In addition, such clamps are generally expensive and may require costly maintenance for the electrical and mechanical actuators.

In addition, many wrapping machines integrate packaging material cutters that sever the web of packaging material at the end of a wrapping operation and once the packaging material has been gripped by a clamp. Furthermore, a wipe down mechanism is generally used to press the "tail" of packaging material that remains attached to the load once the web is severed. Conventional wipe down mechanisms utilize a reach arm that either pops up from a retracted position or swings inwardly from a position outside of the wrap zone (or zone of rotation), and many generally employ plastic loops that wipe across the side of the load to adhere the packaging material tail to the side of the load. In some instances, the movement of the load itself, e.g., on a conveyor once the wrapping operation is complete, may be used to move the load past a stationary wipe down mechanism.

Conventional wipe down mechanisms, however, are often relatively complex and may be difficult to incorporate into some applications, including, for example, applications where a load is supported on the ground rather than on a conveyor or turntable. Furthermore, some wipe down mechanisms can produce inconsistent results, with tails that are inadequately adhered to the side of the load. Such unadhered tails, however, can be problematic during later transportation and storage as they can present a snagging hazard for fork trucks and other load racking devices.

Therefore, a significant need continues to exist in the art for an improved manner of adhering a packaging material tail to a load at the completion of a wrapping operation.

SUMMARY OF THE INVENTION

The invention addresses these and other problems associated with the art by providing a method, apparatus and program product that in some instances may utilize pressurized fluid flow from a position generally upstream of a free end of a packaging material tail and at an acute angle relative to the side of a load while the free end of the packaging material tail is unsupported to cause the packaging material tail to come into contact with the side of the load at the completion of a wrapping operation. In addition, in some instances, pressurized fluid flow may be directed in two or more directions and from two or more positions to assist in adhering a packaging material tail to the side of a load.

Therefore, consistent with one aspect of the invention, an apparatus for wrapping a load may include a packaging material dispenser configured to dispense a web of packaging material to the load, a rotational drive configured to generate relative rotation between the packaging material dispenser and the load about a center of rotation, a cutting assembly configured to sever the web of packaging material to form a packaging material tail extending from a corner of the load, and a flow device configured to direct a flow of fluid towards the packaging material tail from a position generally upstream of a free end of the packaging material tail and at an acute angle relative to the side of the load while the free end of the packaging material tail is unsupported to cause the packaging material tail to come into contact with the side of the load.

In some embodiments, the flow of fluid is further directed at an acute angle relative to a plane extending between the corner of the load and the cutting assembly. Also, in some embodiments, the angle is less than about 45 degrees relative to the side of the load. Further, in some embodiments, the angle is less than about 30 degrees relative to the side of the load.

In some embodiments, the flow of fluid is substantially horizontal. In addition, in some embodiments, the flow of fluid is directed slightly upward from horizontal to compensate for a weight of the packaging material tail when unsupported. In some embodiments, the flow of fluid has a rate of about 9 to about 15 miles per hour. In addition, in some embodiments, the flow of fluid has a rate of about 11 to about 13 miles per hour. Moreover, in some embodiments, a cross-section of the flow of fluid in a plane extending between the corner and the cutting assembly has a height that is less than or equal to a height of the web of packaging material as presented to the cutting assembly. In some embodiments, a cross-section of the flow of fluid in a plane extending between the corner and the cutting assembly has a height that is less than about 18 inches. Moreover, in some embodiments, a cross-section of the flow of fluid in a plane extending between the corner and the cutting assembly has a width that is about 12 inches to about 14 inches to accommodate loads of differing dimensions.

In some embodiments, the packaging material tail is heated prior to contact with the side of the load to increase adherence of the packaging material tail to the side of the load. In addition, in some embodiments, the packaging material tail is heated by the flow of fluid. Some embodiments may also include a heat source configured to heat fluid emitted by the flow device. Moreover, in some embodiments, the flow device is a first flow device, the flow of fluid is a first flow of fluid, the position is a first position, the acute angle is a first angle, and the apparatus further includes a second flow device configured to direct a second flow of fluid towards the packaging material tail from a second position and at a second angle relative to the side of the load, and the packaging material tail is heated by the second flow of fluid. Also, in some embodiments, the packaging material tail is heated by direct contact. Some embodiments may also include a heated roller configured to engage the packaging material tail to heat the packaging material tail by direct contact.

In addition, some embodiments may also include a controller coupled to the cutting assembly and the flow device, the controller configured to activate the flow device to direct the flow of fluid towards the packaging material tail prior to, concurrently with, or after activating the cutting assembly to sever the web of packaging material.

Also, in some embodiments, the flow device includes one or more nozzles coupled to a source of pressurized fluid. Moreover, in some embodiments, the one or more nozzles are rotatably supported by a support assembly that is at least partially inside of a zone of rotation for the packaging material dispenser to rotate between a substantially horizontal storage position and a substantially vertical operating position. Further, in some embodiments, the one or more nozzles are disposed outside of a zone of rotation for the packaging material dispenser. Also, in some embodiments, the one or more nozzles are disposed at a fixed location. Further, in some embodiments, the one or more nozzles are supported by a support structure of the apparatus. In some embodiments, the one or more nozzles are supported by the packaging material dispenser. Also, in some embodiments, the source of pressurized fluid includes a fan, a blower, a compressor or a pressurized hose.

In some embodiments, the flow device is a first flow device, the flow of fluid is a first flow of fluid, the position is a first position, the acute angle is a first angle, and the apparatus further includes a second flow device configured to direct a second flow of fluid towards the packaging material tail from a second position and at a second angle relative to the side of the load that is larger than the first angle to increase adherence of the packaging material tail to the side of the load. Further, in some embodiments, the second angle is substantially orthogonal relative to the side of the load. In some embodiments, the second flow device is configured to be activated after the first flow device is activated. Further, in some embodiments, the second flow device is configured to be activated concurrently with the packaging material tail coming into contact with the side of the load.

Also, in some embodiments, the second flow device is configured to direct the second flow of fluid towards the packaging material tail by directing a plurality of pulsed flows of fluid towards the packaging material tail. In addition, in some embodiments, the plurality of pulsed flows of fluid impact the packaging material tail at a plurality of locations across a width of the packaging material tail. In some embodiments, the first flow of fluid has a lower velocity than the second flow of fluid, the first flow of fluid has a higher volume than the second flow of fluid, and the first flow of fluid has a longer duration than the second flow of fluid. In addition, in some embodiments, the second flow device includes one or more nozzles coupled to a source of pressurized fluid, the source of pressurized fluid includes a fan, a blower, a compressor or a pressurized hose, and the one or more nozzles are rotatably supported by a support assembly that is at least partially inside of a zone of rotation for the packaging material dispenser to rotate between a substantially horizontal storage position and a substantially vertical operating position.

Consistent with another aspect of the invention, a method of securing a packaging material tail to a side of a wrapped load may be provided, where the packaging material tail is formed by severing a web of packaging material extending between a corner of the load and a cutting assembly. The method may include directing a first flow of fluid towards the packaging material tail from a first position generally upstream of a free end of the packaging material tail and at a first angle relative to the side of the load, and directing a second flow of fluid towards the packaging material tail from a second position and at a second angle relative to the side of the load, where the first angle is smaller than the second angle.

Also, in some embodiments, the first angle is an acute angle relative to the side of the load. In addition, in some embodiments, the first angle is an acute angle relative to a plane extending between the corner of the load and the cutting assembly. In some embodiments, the first angle is less than about 45 degrees relative to the side of the load. Further, in some embodiments, the first angle is less than about 30 degrees relative to the side of the load.

In addition, in some embodiments, the second angle is substantially orthogonal relative to the side of the load. Further, in some embodiments, the first and second flows of fluid are substantially horizontal. Moreover, in some embodiments, the first flow of fluid is directed slightly upward from horizontal to compensate for a weight of the packaging material tail when unsupported. Further, in some embodiments, the first flow of fluid has a rate of about 9 to about 15 miles per hour. In some embodiments, the first flow of fluid has a rate of about 11 to about 13 miles per hour. Moreover, in some embodiments, a cross-section of the first flow of fluid in a plane extending between the corner and the cutting assembly has a height that is less than or equal to a height of the web of packaging material as presented to the cutting assembly. Further, in some embodiments, a cross-section of the first flow of fluid in a plane extending between the corner and the cutting assembly has a height that is less than about 18 inches. In addition, in some embodiments, a cross-section of the first flow of fluid in a plane extending between the corner and the cutting assembly has a width that is about 12 inches to about 14 inches to accommodate loads of differing dimensions.

Also, in some embodiments, directing the first flow of fluid towards the packaging material tail is performed before directing the second flow of fluid towards the packaging material tail. Moreover, in some embodiments, directing the first flow of fluid towards the packaging material tail is performed before severing the web of packaging material. In some embodiments, directing the first flow of fluid towards the packaging material tail is performed concurrently with severing the web of packaging material. Further, in some embodiments, directing the first flow of fluid towards the packaging material tail is performed after severing the web of packaging material. Also, in some embodiments, directing the first flow of fluid towards the packaging material tail is performed while the free end of the packaging material tail is unsupported. Further, in some embodiments, directing the first flow of fluid towards the packaging material tail causes the packaging material tail to come into contact with the side of the load.

Also, in some embodiments, directing the first flow of fluid towards the packaging material tail reduces bunching of the packaging material tail widthwise and/or lengthwise prior to coming into contact with the side of the load. In addition, in some embodiments, directing the second flow of fluid towards the packaging material tail increases adherence of the packaging material tail to the side of the load. Moreover, in some embodiments, directing the second flow of fluid towards the packaging material tail is performed after the packaging material tail comes into contact with the side of the load. In some embodiments, directing the second flow of fluid towards the packaging material tail is performed before the packaging material tail comes into contact with the side of the load. Further, in some embodiments, directing the second flow of fluid towards the packaging material tail is performed concurrently with the packaging material tail coming into contact with the side of the load. In some embodiments, directing the second flow of fluid towards the packaging material tail includes directing a plurality of pulsed flows of fluid towards the packaging material tail. Moreover, in some embodiments, the plurality of pulsed flows of fluid impact the packaging material tail at a plurality of locations across a width of the packaging material tail.

Further, in some embodiments, the first flow of fluid has a lower velocity than the second flow of fluid. In some embodiments, the first flow of fluid has a higher volume than the second flow of fluid. Also, in some embodiments, the first flow of fluid has a longer duration than the second flow of fluid. Moreover, in some embodiments, the first position is farther from the side of the load than the second position.

In addition, in some embodiments, directing the second flow of fluid towards the packaging material tail is performed using one or more nozzles coupled to a source of pressurized fluid. Also, in some embodiments, the one or more nozzles are rotatably supported by a support assembly that is at least partially inside of a zone of rotation for a packaging material dispenser that rotates about the load to rotate between a substantially horizontal storage position and a substantially vertical operating position. In some embodiments, the source of pressurized fluid includes a fan, a blower, a compressor or a pressurized hose. In addition, in some embodiments, directing the first flow of fluid towards the packaging material tail is performed using one or more nozzles coupled to a source of pressurized fluid. Also, in some embodiments, the one or more nozzles are rotatably supported by a support assembly that is at least partially inside of a zone of rotation for a packaging material dispenser that rotates about the load to rotate between a substantially horizontal storage position and a substantially vertical operating position. In some embodiments, the one or more nozzles are disposed outside of a zone of rotation for a packaging material dispenser that rotates about the load. Moreover, in some embodiments, the one or more nozzles are disposed at a fixed location. In some embodiments, the one or more nozzles are supported by a support structure of a stretch wrapping machine. Also, in some embodiments, the one or more nozzles are supported by the packaging material dispenser. Moreover, in some embodiments, the source of pressurized fluid includes a fan, a blower, a compressor or a pressurized hose.

Some embodiments may further include, prior to directing the first and second flows of fluid towards the packaging material tail, engaging the web of packaging material with a packaging material holder disposed downstream of the cutting assembly, and severing the web of packaging material with the cutting assembly while the web of packaging material is engaged by the packaging material holder. Moreover, in some embodiments, the cutting assembly includes a hot wire cutting assembly. Further, in some embodiments, the packaging material holder includes first and second opposing jaws having an opening therebetween for receiving the web of packaging material. In addition, in some embodiments, the packaging material holder further includes at least one inflatable element disposed between the first and second opposing jaws and convertible between a first, unpressurized condition defining a gap within the opening, and a second, pressurized condition closing the gap to thereby clamp the web of packaging material in the opening when the packaging material is received in the opening. Further, in some embodiments, engaging the web of packaging material with the packaging material holder further includes inserting an insertion tool into the opening between the first and second opposing jaws to urge the web of packaging material into the opening.

Some embodiments may also include, prior to directing the first and second flows of fluid towards the packaging material tail moving the packaging material holder to a first position adjacent the side of the load while the packaging material holder engages a leading end of the web of packaging material, wrapping the load while the packaging material holder is in the first position by generating relative rotation between a packaging material dispenser and the load about a center of rotation, where wrapping the load at least partially wraps packaging material over the packaging material holder, and after wrapping the load, disengaging the packaging material holder from the web of packaging material and moving the packaging material holder to a second position and away from the side of the load, where engaging the web of packaging material with the packaging material holder, inserting the insertion tool into the opening and severing the web of packaging material with the cutting assembly are performed when the packaging material holder is in the second position and after the packaging material holder is disengaged from the web of packaging material.

In addition, in some embodiments, the packaging material holder is mounted to a support arm configured to rotate about a substantially vertical axis, and the packaging material holder is movable between the first and second positions via rotation of the support arm about the substantially vertical axis. Moreover, in some embodiments, the cutting assembly and the insertion tool are rotatably supported by a support assembly that is at least partially inside of a zone of rotation for the packaging material dispenser to rotate between respective substantially horizontal storage positions and respective substantially vertical operating positions.

Consistent with another aspect of the invention, a method of securing a packaging material tail to a side of a wrapped load may include severing a web of packaging material extending between a corner of the load and a cutting assembly to form a packaging material tail extending from the corner of the load, directing a first flow of fluid towards the packaging material tail from a first position generally upstream of a free end of the packaging material tail and at a first angle relative to the side of the load while the free end of the packaging material tail is unsupported to cause the packaging material tail to come into contact with the side of the load, and after directing the first flow of fluid towards the packaging material tail, directing a second flow of fluid towards the packaging material tail from a second position and at a second angle relative to the side of the load to increase adherence of the packaging material tail to the side of the load, where the first angle is an acute angle relative to the side of the load and the second angle is substantially orthogonal relative to the side of the load.

Consistent with another aspect of the invention, a method of securing a packaging material tail to a side of a wrapped load may include severing a web of packaging material extending between a corner of the load and a cutting assembly to form a packaging material tail extending from the corner of the load, directing a flow of fluid towards the packaging material tail from a position generally upstream of a free end of the packaging material tail and at an acute angle relative to the side of the load while the free end of the packaging material tail is unsupported to cause the packaging material tail to come into contact with the side of the load.

In addition, in some embodiments, the flow of fluid is a first flow of fluid, the position is a first position and the acute angle is a first angle, the method further includes, after directing the first flow of fluid towards the packaging material tail, directing a second flow of fluid towards the packaging material tail from a second position and at a second angle relative to the side of the load to increase adherence of the packaging material tail to the side of the load, and the second angle is substantially orthogonal relative to the side of the load.

In addition, some embodiments may further include, after directing the flow of fluid towards the packaging material tail, mechanically contacting the packaging material tail to increase adherence of the packaging material tail to the side of the load. Further, in some embodiments, mechanically contacting the packaging material tail includes mechanically contacting the packaging material tail with a finger, a pad, or a brush. Also, in some embodiments, the flow of fluid is further directed at an acute angle relative to a plane extending between the corner of the load and the cutting assembly. In addition, in some embodiments, the angle is less than about 45 degrees relative to the side of the load. In some embodiments, the angle is less than about 30 degrees relative to the side of the load.

Consistent with another aspect of the invention, a method of wrapping a load with packaging material may include moving a packaging material holder to a first position adjacent a side of the load while the packaging material holder engages a leading end of a web of packaging material, wrapping the load while the packaging material holder is in the first position by generating relative rotation between a packaging material dispenser and the load about a center of rotation, where wrapping the load at least partially wraps packaging material over the packaging material holder, disengaging the packaging material holder from the web of packaging material and moving the packaging material holder to a second position and away from the side of the load, positioning the web of packaging material adjacent to the packaging material holder and to a cutting assembly disposed upstream of the packaging material holder, engaging the web of packaging material with the packaging material holder, severing the web of packaging material between a corner of the load and the packaging material holder to form a packaging material tail extending from the corner of the load, directing a first flow of fluid towards the packaging material tail from a first position generally upstream of a free end of the packaging material tail and at a first angle relative to the side of the load while the free end of the packaging material tail is unsupported to cause the packaging material tail to come into contact with the side of the load, and after the packaging material tail comes into contact with the side of the load, directing a second flow of fluid towards the packaging material tail from a second position and at a second angle relative to the side of the load to increase adherence of the packaging material tail to the side of the load, where the first angle is an acute angle relative to the side of the load and an acute angle relative to a plane extending between the corner of the load and the cutting assembly, the second angle is substantially orthogonal relative to the side of the load, and the first flow of fluid has a higher volume, a longer duration, and a lower velocity than the second flow of fluid.

Other embodiments may include a load wrapping apparatus, a cut and clamp mechanism or a controller configured to perform any one of the aforementioned methods. Still other embodiments may include an apparatus for wrapping a load and including a packaging material dispenser for dispensing packaging material to the load, a rotational drive configured to generate relative rotation between the packaging material dispenser and the load about a center of rotation, and a controller coupled to the packaging material dispenser and the rotational drive and configured to perform any one of the aforementioned methods. Other embodiments may include a program including a computer readable medium and program code configured upon execution by a controller in an apparatus that wraps a load with packaging material using a packaging material dispenser adapted for relative rotation with the load about a center of rotation, and that is configured to perform any one of the aforementioned methods.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention.

DETAILED DESCRIPTION

Figure 1:
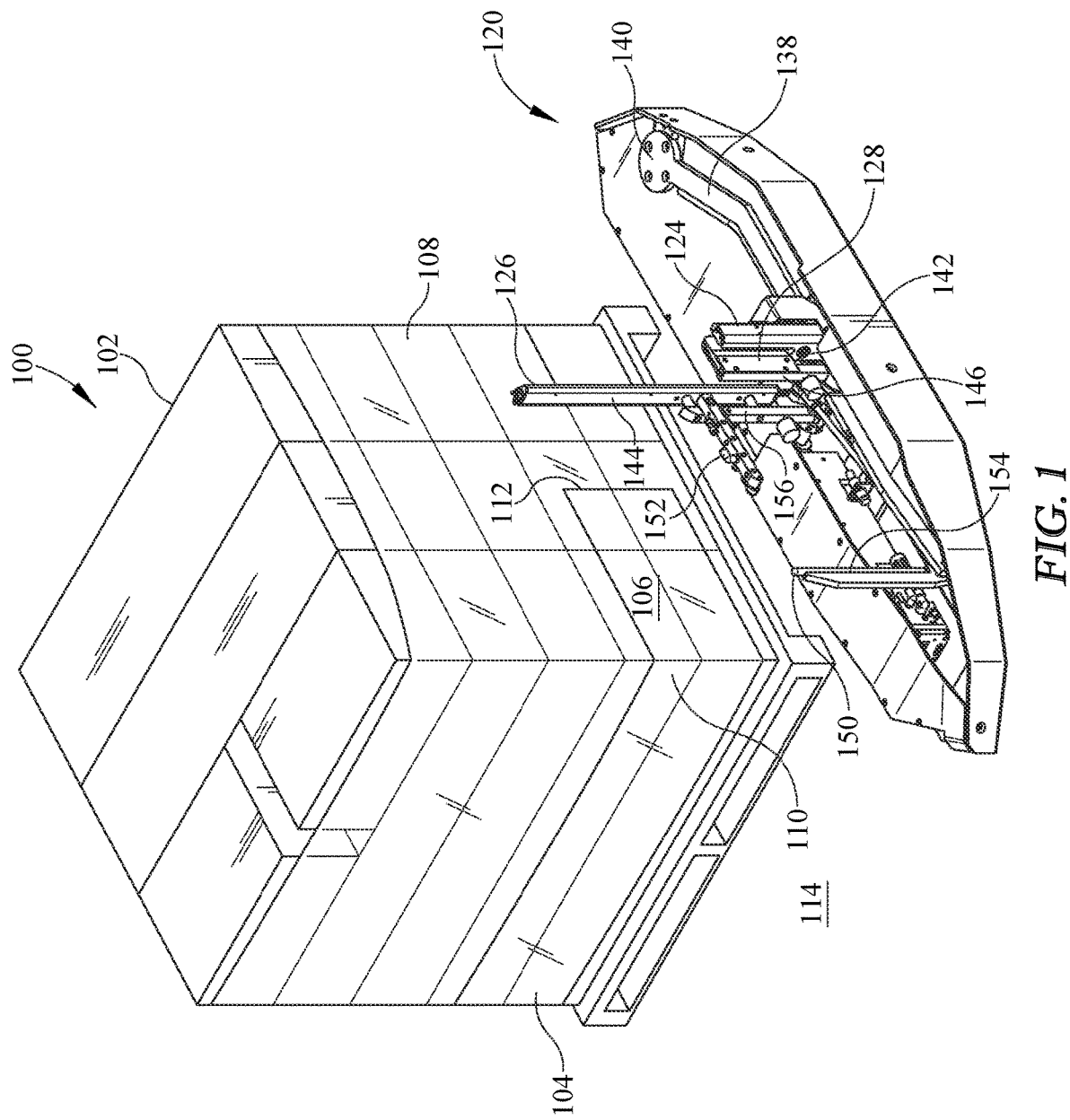
FIG. 1 shows a perspective view of a rotating arm-type wrapping apparatus consistent with the invention.

Embodiments consistent with the invention may utilize pressurized fluid flow directed upstream and/or in two or more directions to assist in adhering a packaging material tail to the side of a load at the completion of a wrapping operation. In this regard, a packaging material tail generally refers to a portion of a web of packaging material that extends between a load and a packaging material dispenser at the completion of a wrapping operation, and generally the portion of the web that extends between a last corner of the load around which the web of packaging material is wrapped and a cutting assembly that severs the web of packaging material at the completion of the wrapping operation.

A packaging material tail may, in many instances, be shorter in length than the width of the side of the load to which it adheres, and it is generally desirable to adhere the packaging material tail to the side of the load to minimize the risk that the packaging material tail will detach from the load. An improperly adhered tail, for example, may detract from the visual appearance of the load, and can also potentially result in a snagging hazard, e.g., capable of snagging on a fork truck, a shelf, a truck trailer, or any other structures that a load may encounter during transportation and/or storage.

It will be appreciated that the packaging material used in a stretch wrapping machine is generally formed of a polymer material having some degree of stickiness, particularly between overlapping layers of the packaging material. Thus, to optimize the adherence of the packaging material tail to the load, it is generally desirable to lay the packaging material tail over a portion of the load that is already wrapped with packaging material, and to do so with as little bunching of the packaging material tail (both across its width and along its length) as is feasible to maximize the surface area overlapped by the packaging material tail.

In some embodiments consistent with the invention, pressurized fluid flow is emitted in multiple directions to both inhibit bunching of the packaging material tail prior to the packaging material tail engaging with the side of the load (e.g., during the time period between the web of packaging material being severed and coming into contact with side of the load) and to further adhere the packaging material tail to the side of the load. The pressurized fluid flow may, for example, be forced air or another gas, and may be generated, for example, using a fan, a blower, a compressor or another source of pressurized and/or compressed fluid. Moreover, the pressurized fluid flow emitted in different directions may be emitted from different distances, from different positions, at different pressures, at different volumes, at different velocities and/or over different time periods.

In some instances, the pressurized fluid flow may occur in multiple stages, and may be directed in multiple directions, to inhibit bunching of the packaging material and/or improve adherence of the packaging material to the side of the load. In some particular instances, a pressurized fluid such as air may be directed in two directions during two different stages.

In a first stage, pressurized fluid may be directed from an upstream position relative to the free end of the packaging material tail and in a first direction that forms an acute angle relative to a plane of the web of packaging material prior to severing the web, with the first stage occurring proximate in time to the severing of the web, e.g., slightly before, slightly after, or simultaneously therewith. It may be desirable in some embodiments for the flow to be higher volume but lower velocity than the second stage, with the goal being to at least temporarily "fill" the packaging material tail in a similar manner to a sail or flag and lay the packaging material tail over the side of the load. By filling the packaging material tail as it lays over the side of the load, bunching of the packaging material tail both across its width and along its length is desirably reduced, thereby increasing the surface area of the load overlapped by the packaging material tail, increasing the adhesion of the packaging material tail to the side of the load, and providing a visually pleasing appearance.

It should also be note that when a web is severed, the web is generally under tension, so the packaging material tail formed once the web is severed is generally subject to a restoring force that in the absence of any fluid flow will tend to cause the packaging material tail to "spring back" and bunch up lengthwise. Thus, the first stage fluid flow may also be suitable for opposing this restoring force and resisting lengthwise bunching of the packaging material tail as it lays onto the side of the load.

In a second stage, pressurized fluid may be directed from a relatively closer position to the load and in a second direction that is generally orthogonal to the side of the load, with the second stage occurring proximate in time to the packaging material tail coming into contact with the side of the load, e.g., slightly before, slightly after, or simultaneously therewith. In some instances, the second stage may also occur well after the packaging material tail comes into contact with the side of the load. In some embodiments, it may be desirable for the second stage flow to be relatively higher velocity but lower volume than the first stage, and generally with a shorter duration. In addition, the second stage flow may include multiple pulses or blasts, at either the same location or at multiple locations across the width of the packaging material tail, with the goal being to effectively press the packaging material tail against the side of the load to increasing adherence of the packaging material tail to the packaging material wrapped around the load.

In other embodiments, pressurized fluid flow may only be used in a single stage, e.g., directed from an upstream position relative to the free end of the packaging material tail and in a direction that forms an acute angle relative to a side of the load, or in some instances, an acute angle relative to a plane of the web of packaging material prior to severing the web, with the single stage occurring proximate in time to the severing of the web, e.g., slightly before, slightly after, or simultaneously therewith. In such embodiments, the single stage fluid flow may provide sufficient adherence of the packaging material tail to the side of the load, although in other embodiments, it may be desirable to mechanically contact the packaging material tail to press the packaging material tail against the side of the load once the packaging material tail has come into contact with the side of the load. The mechanical contact may be provided, for example, by a finger, a pad, a brush or another mechanism capable of pressing, wiping, or smoothing the packaging material tail against the side of the load.

It will be appreciated that embodiments consistent with the invention generally are utilized in connection with a trailing packaging material tail that extends between a last corner of the load around which the web of packaging material is wrapped and a cutting assembly that severs the web of packaging material at the completion of the wrapping operation, rather than with any unsupported section of packaging material forming a leading end of the packaging material that may extend between a temporary from a first corner of a load and a clamp that initially holds the web of packaging material at the start of a wrapping operation performed by some types of stretch wrapping machines. Blasts of air have been used for the latter application for the purpose of blowing the unsupported section of packaging material against the side of the load so that subsequent wraps will cover up this unsupported section; however, such blasts have generally been performed predominantly upwardly from a location beneath a conveyor supporting the load and alongside the side of the load. Similar blasts of air, from a similar position and in a similar predominantly upward orientation have also been used in connection with a mechanical contact mechanism. Embodiments consistent with the invention, in contrast, may direct one or more fluid flows at a trailing packaging material tail from different positions and orientations as described above to improve the adhesion of the packaging material tail to the side of the load and/or improve the appearance of the adhered packaging material tail on the load.

Now turning to the drawings, wherein like numbers denote like parts throughout the several views, FIGS. 1-7 illustrate an apparatus 100 for wrapping a load 102 with packaging material 104, as well as for performing a packaging material tail treatment operation to secure a packaging material tail 106 to a side 108 of load 102. As illustrated in FIG. 1, packaging material tail 106 generally extends from a corner 110 and terminates at a free end 112, and desirably is substantially free of bunching in a lengthwise direction (horizontal in FIG. 1) and a widthwise direction (vertical in FIG. 1) to maximize the surface area of packaging material tail 106 that overlaps side 108, and thereby optimizes adherence of the packaging material tail to the side of the load.

In the illustrated embodiment, apparatus 100 is a rotating arm-type wrapping apparatus, and moreover, is configured to wrap loads that are placed directly on a floor 114. In other embodiments, however, apparatus 100 may be a turntable-type wrapping apparatus or a vertical or horizontal ring-type apparatus, and furthermore, apparatus 100 may be configured to wrap loads supported on various types of load supports, e.g., turntables, conveyors, platforms, floors, etc.

Apparatus 100 may include a support assembly 120, also referred to as a cut and clamp assembly, positioned adjacent a load and configured to both position a leading end of a packaging material web against load 102 at the start of a wrapping operation and sever a trailing end of the packaging material web wrapped around load 102 at the end of a wrapping operation. Further, as discussed above, apparatus 100 is additionally capable of performing a packaging material tail treatment operation such that, when the trailing end of the packaging material web is severed, the packaging material tail formed thereby is secured to the side of the load.

Support assembly 120 may include a base 122, a packaging material holder 124 for selectively holding and releasing (or engaging and disengaging) a leading end portion of a packaging material web, a cutting assembly 126 for severing the packaging material web, and an insertion tool 128 for urging the web of packaging material into an opening 130 disposed between first and second opposing jaws 132, 134 of packaging material holder 124. One or more bladders or inflatable elements 136 are disposed between second opposing jaws 132, 134 and are convertible between first, unpressurized conditions defining a gap within opening 130, and second, pressurized conditions closing the gap to thereby clamp the web of packaging material in opening 130 when packaging material is received in opening 130.

Cutting assembly 126 may be used to sever the packaging material while the web of packaging material is engaged by holder 124, and may, in some embodiments, be implemented using a hot wire that melts the packaging material when current is passed through the wire and the packaging material comes into contact with the wire. In other embodiments, however, other cutting assemblies, e.g., using knives or sharp edges, may be used.

Packaging material holder 106 is movable between a first position adjacent the side of the load (illustrated in FIG. 3) and a second position (illustrated in FIGS. 1-2) away from the side of the load, and in the illustrated embodiment, such movement is provided via a support arm 138 that rotates about a substantially vertical axis extending through hub 140. Holder 106 is positioned in the first position during wrapping such that packaging material is wrapped over at least a portion of the holder, and as such, holder 106 includes a rotatable hinged wrist portion 142 that enables the holder to be pulled out from under the packaging material wrapped around the load when moved from the first position to the second position at the conclusion of wrapping packaging material around the load.

Figure 2:
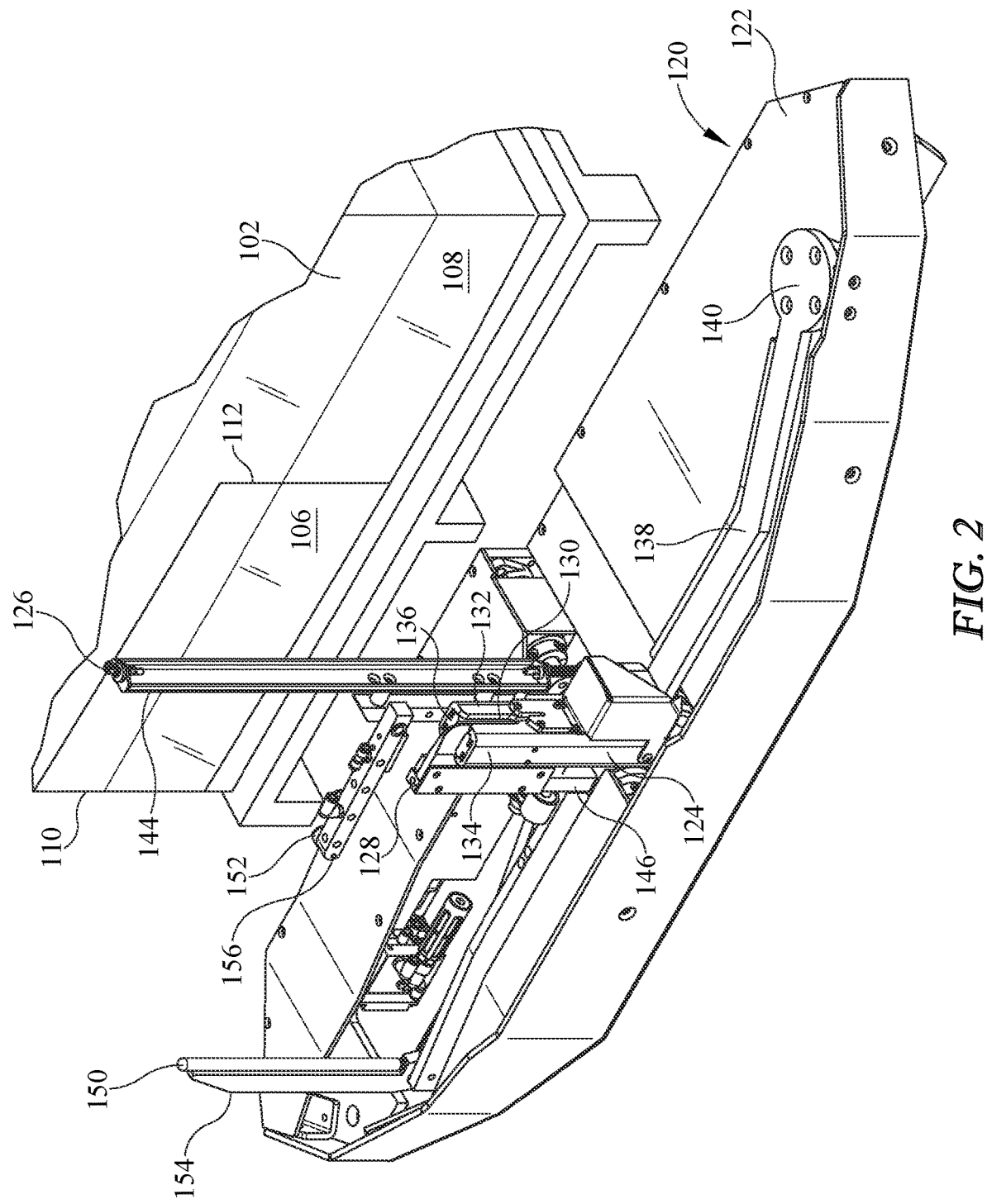
FIG. 2 is an enlarged partial perspective view of the apparatus of FIG. 1.

In the illustrated embodiment, support assembly 120 is at least partially inside of a zone of rotation for a packaging material dispenser of apparatus 100 (not shown in FIGS. 1-2). Moreover, in some positions (e.g., when wrapping around the pallet or the bottom of the load) little clearance is available between the packaging material dispenser and floor 114, so it may be desirable to configure support assembly 120 as a low profile assembly and to incorporate retractable components into the support assembly to reduce the height of the support assembly during at least portions of a wrapping operation.

For example, in the illustrated embodiment, each of cutting assembly 126 and insertion tool 128 are rotatably supported on respective arms 144, 146 to rotate between respective substantially horizontal storage positions (illustrated, for example, in FIG. 3) and respective substantially vertical operating positions (illustrated, for example, in FIGS. 1-2). Movement of arms 144, 146 may be controlled via pneumatic or hydraulic actuators, by electric drives, or in other appropriate manners.

Support assembly 120 may otherwise be configured in various manners, e.g., as disclosed in U.S. Pat. No. 8,695,312, which is assigned to the same assignee as the present application, and which is incorporated by reference herein.

In addition, support assembly 120 further includes first and second flow devices 150, 152 that are respectively supported on arms 154, 156 and that are similarly retractable as cutting assembly 126 and insertion tool 128, whereby each flow device 150, 152 is movable between a respective substantially horizontal storage position (illustrated, for example, in FIG. 3) and a respective substantially vertical operating position (illustrated, for example, in FIGS. 1-2).

Movement of arms 154, 156 may be controlled via pneumatic or hydraulic actuators, by electric drives, or in other appropriate manners.

First flow device 150 is disposed at a first position that is generally upstream of free end 112 of packaging material tail 106 and includes one or more nozzles oriented to direct a first flow of fluid towards packaging material tail 106 at a first angle relative to the side of the load. Similarly, second flow device 152 is disposed at a second position that is generally closer to the side of the load than the first position, and includes one or more nozzles oriented to direct a second flow of fluid towards packaging material tail 106 at a second angle relative to side 108 of load 102. As will become more apparent below, the first angle is smaller than the second angle, and in some embodiments, the first angle is acute relative to the side of the load. In some instances, the first angle is less than about 45 degrees relative to the side of the load, and in some instances, the first angle is less than about 30 degrees relative to the side of the load. Further, in some embodiments, the first angle is acute relative to a plane extending between corner 110 of load 102 and cutting assembly 126. Moreover, in some embodiments, the second angle is substantially orthogonal relative to side 108 of load 102. Further, in some embodiments, the elevation of each of flow devices 150, 152 is also desirably at a similar elevation to that of tail 106 such that both flows of fluid are substantially horizontal relative to floor 114. In some embodiments, it may be desirable to orient one or both of flow devices 150, 152, to direct their flows of fluid at a somewhat upward angle to compensate for the downward gravitational force due to the weight of the packaging material in the tail, as it is generally desirable for tail 106 to lay over the side 108 of load 102 substantially horizontally. It will be appreciated that, from the perspective of the flows of fluid, substantially horizontally may be considered in some embodiments to include a flow of fluid where at least one axis of flow (e.g., an axis defined by a nozzle of a flow device) is substantially horizontal (e.g., within about +/−10 degrees of a horizontal plane). It may also be desirable in some embodiments for a flow of fluid to be at least predominantly horizontal, which in the context of this disclosure maybe considered to be a flow of fluid in which the majority of the fluid flow is less than about 45 degrees from a horizontal plane.

Each flow device 150, 152 may be implemented in a number of manners, and may be coupled to a source of pressurized fluid, e.g., a fan, a blower, a compressor, a pressurized hose, etc. Each flow device 150, 152 may include one or more nozzles, and each nozzle may have different flow characteristics, e.g., in terms of exit velocity, flow volume, stream width, etc. suitable for providing desired fluid flow at each of the first and second positions. A flow device may also incorporate an air amplifier or air knife, and may generate fluid flow of various sizes, cross-sections, etc.

In some embodiments, for example, flow device 150 may be configured to generate fluid flow having a rate of about 9 to about 15 miles per hour, and in some embodiments, a rate of about 11 to about 13 miles per hour. In addition, the cross-section of the fluid flow emitted by flow device 150 may desirably be about 18 inches in height and about 12 to about 14 inches in width in the plane extending between corner 110 and cutting assembly 126 (which also generally corresponds to the plane of a packaging material web 160 as presented to the cutting assembly 126), with the height generally selected to be less than or equal to the height of the packaging material web 160 as presented to the cutting assembly 126, and with the width generally selected to be sufficient to accommodate loads 102 of differing dimensions (given that the location of corner 110 will necessarily depend upon the length, width and/or offset of the load relative to support assembly 120.

Figure 3:
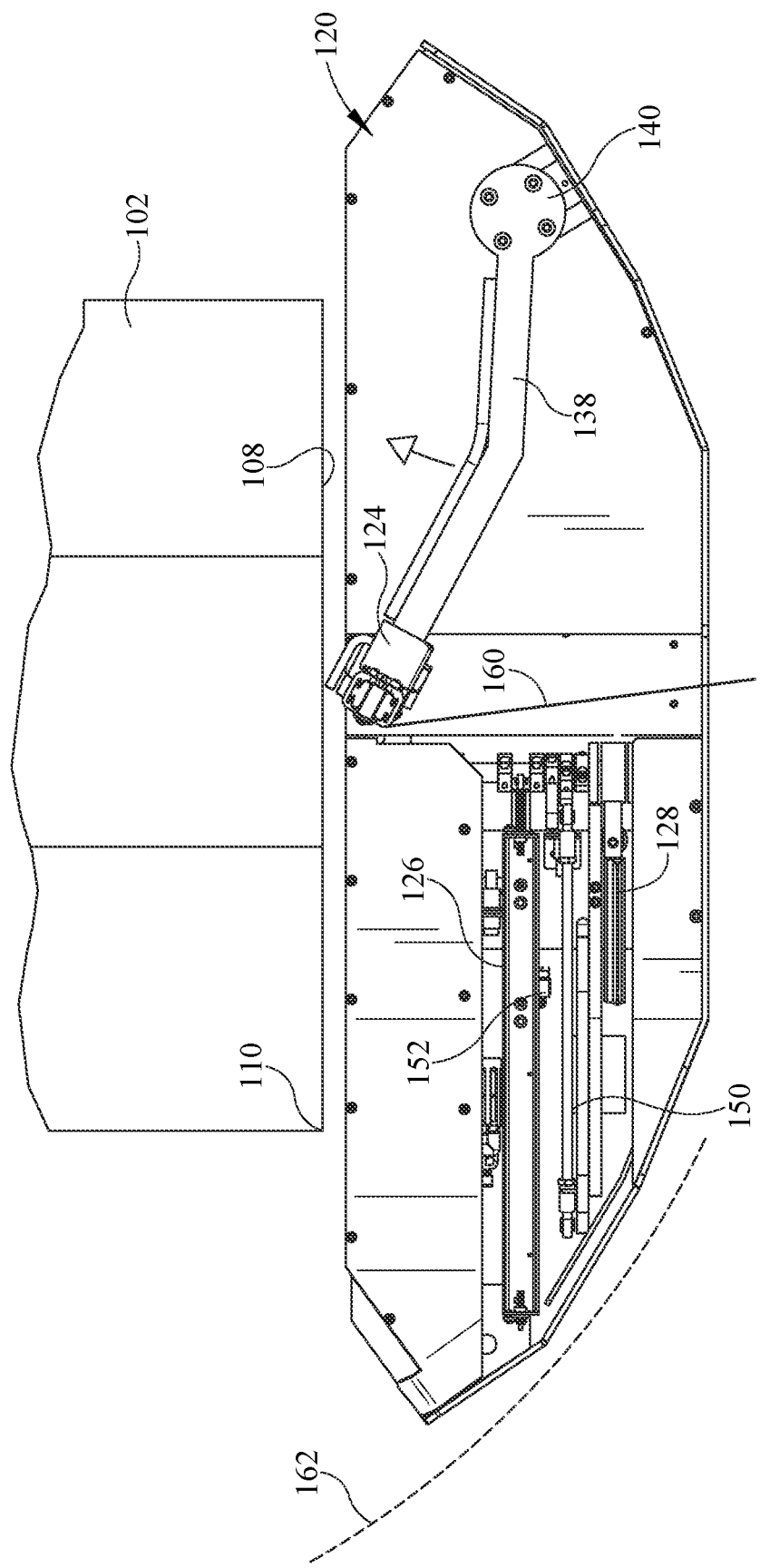
FIG. 3 is an enlarged partial top plan view of the apparatus of FIG. 1, illustrating a start of a wrapping operation.
Figure 6:
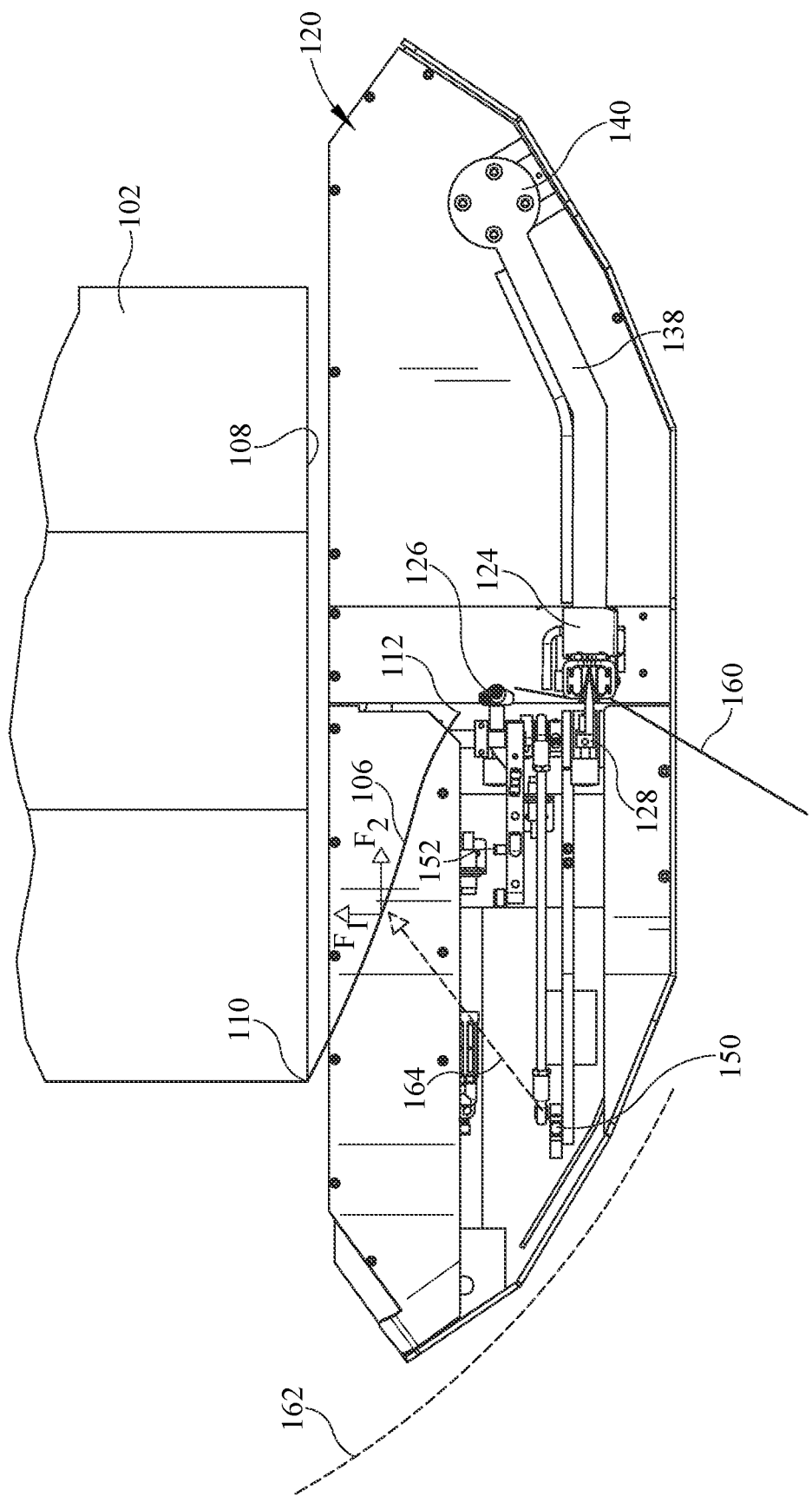
FIG. 6 is an enlarged partial top plan view of the apparatus of FIG. 1, illustrating a first stage of a tail treatment operation performed in connection with severing the packaging material web at the end of the wrapping operation.
Figure 7:
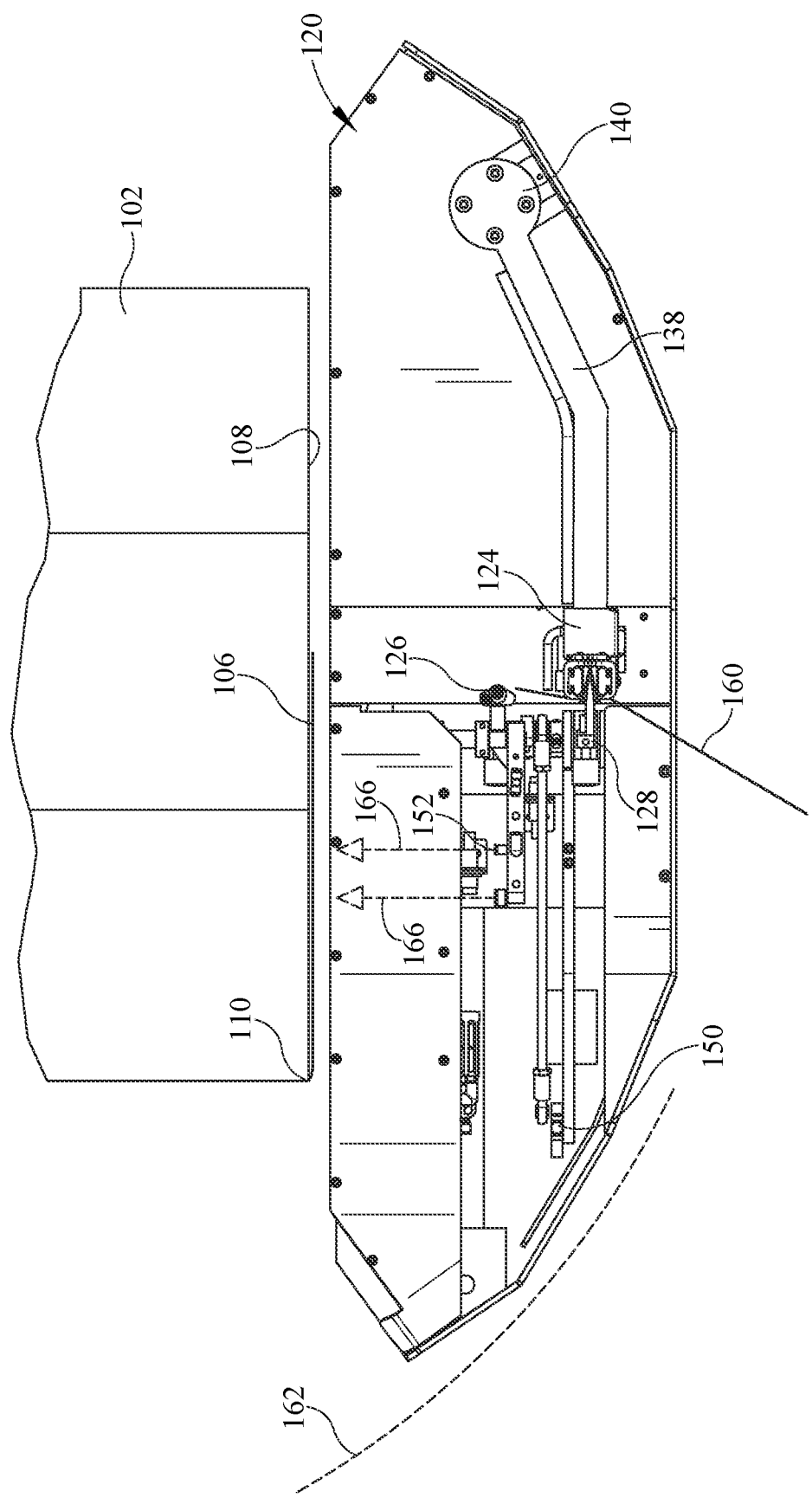
FIG. 7 is an enlarged partial top plan view of the apparatus of FIG. 1, illustrating a second stage of the tail treatment operation performed in connection with severing the packaging material web at the end of the wrapping operation.
Figure 8:
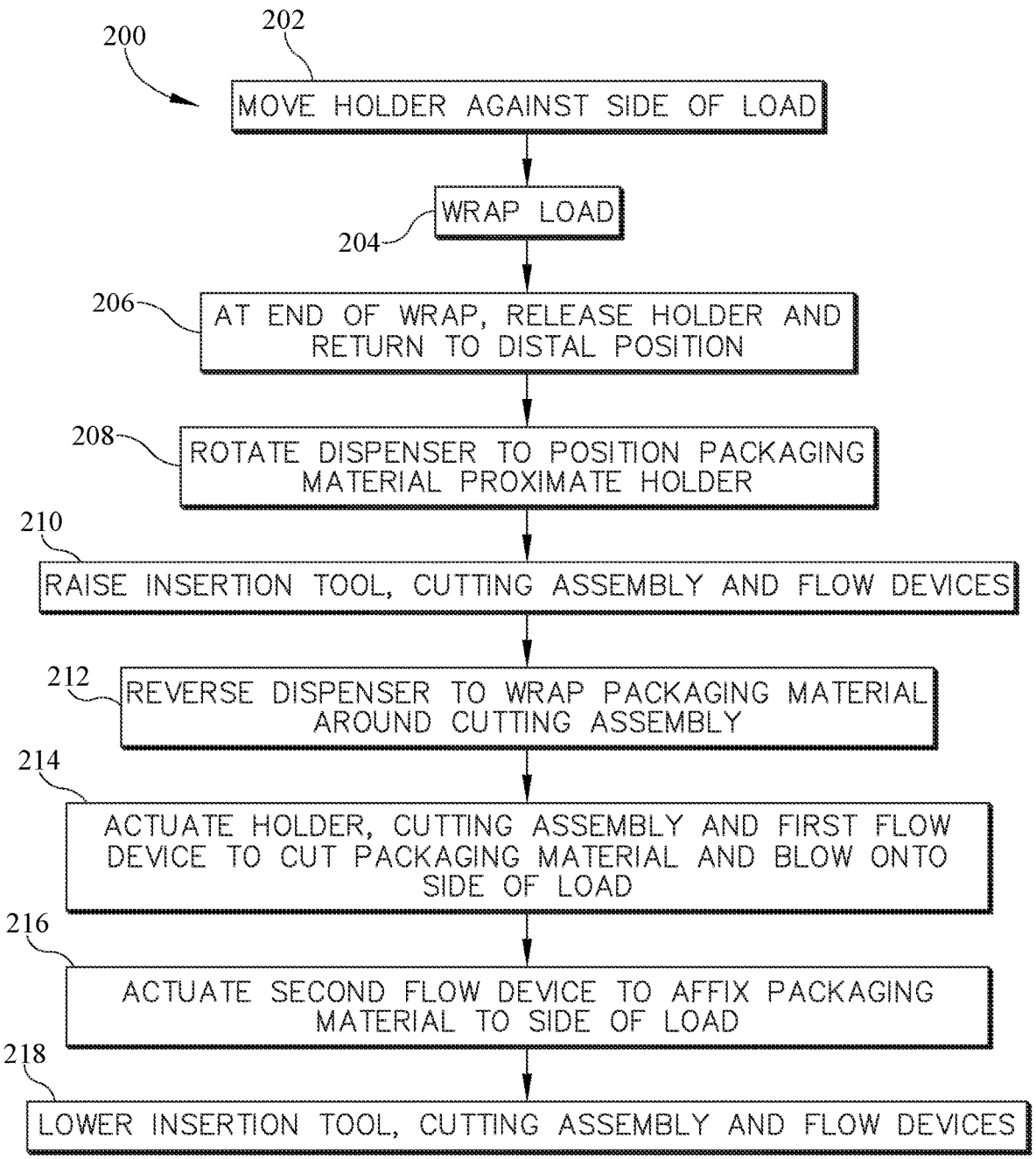
FIG. 8 is a flowchart illustrating an example sequence of operations for wrapping a load using the apparatus of FIGS. 1-7.

Now turning to FIG. 8, and with continuing reference to FIGS. 1-7, a sequence of operations 200 for wrapping a load using apparatus 100 is described in greater detail. In particular, as illustrated in FIG. 3, when a wrapping operation is first initiated a leading end of a packaging material web 160 is engaged by holder 124. Moreover, each of cutting assembly 126, insertion tool 128, first flow device 150 and second flow device 152 are initially in their substantially horizontal storage positions such that wrapping can occur proximate the bottom of the load free of obstruction from any of these components.

First, in block 202, holder 124 is rotated from the second position to the first position adjacent side 108 of load 102, as illustrated in FIG. 3. Wrapping then commences in block 204, with rotation of a packaging material dispenser (not shown in FIG. 3) around a zone of wrapping represented by arc 162 (FIG. 3).

Figure 4:
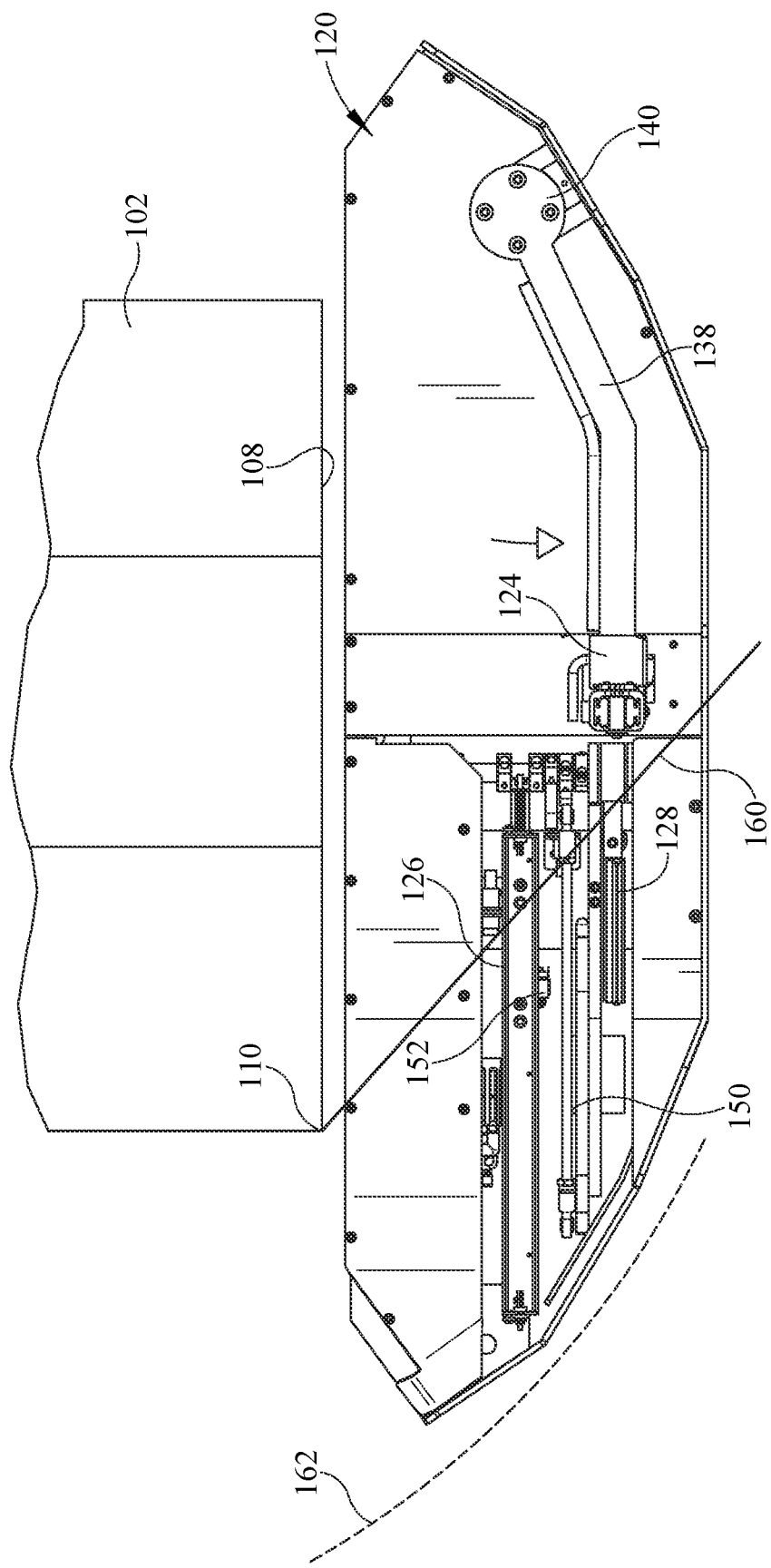
FIG. 4 is an enlarged partial top plan view of the apparatus of FIG. 1, illustrating placement of a packaging material web prior to severing the packaging material web at an end of the wrapping operation.

Next, as illustrated in FIG. 4, at the conclusion of wrapping, holder 124 may be released and returned to its second (distal) position (block 206) and the packaging material dispenser may be rotated to a position that orients packaging material web 160 proximate holder 124 (block 208).

Figure 5:
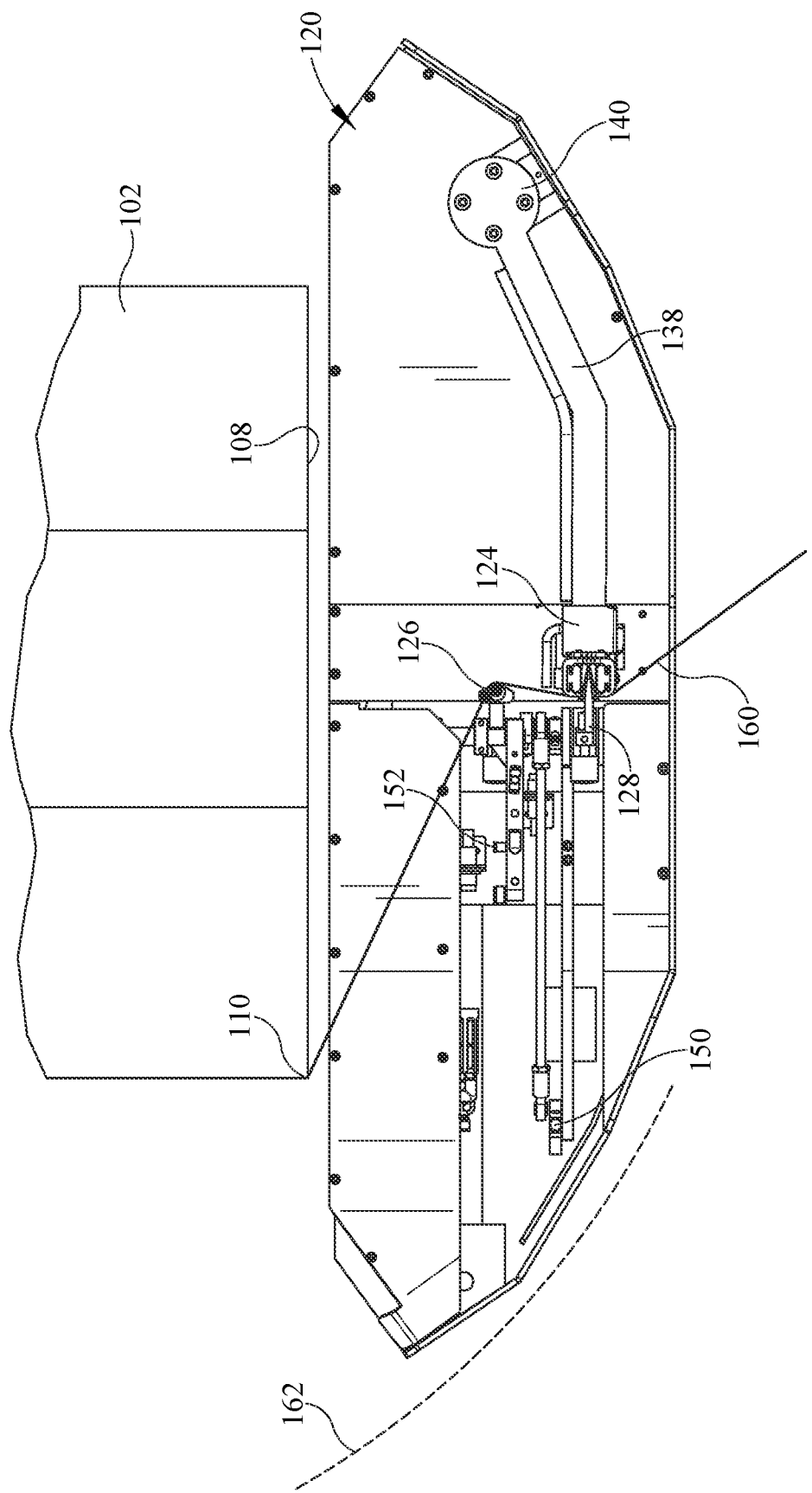
FIG. 5 is an enlarged partial top plan view of the apparatus of FIG. 1, illustrating extension of a cutting assembly, an insertion tool, and first and second flow devices prior to severing the packaging material web at the end of the wrapping operation.

Next, as illustrated in FIG. 5, cutting assembly 126, insertion tool 128 and flow devices 150, 152 are raised to their respective vertical operating positions (block 210), with insertion tool 128 urging the packaging material web into the opening of holder 124 and with the web wrapping around cutting assembly 126.

Next, as illustrated in FIG. 6, the packaging material dispenser may be reversed to further wrap the web around cutting assembly 126 (block 212). Moreover, holder 124 may be actuated to engage the packaging material web, cutting assembly 126 may be actuated to sever the web and form packaging material tail 106, and first flow device 150 may be actuated to blow or urge packaging material tail 106 onto side 108 of load 102 (block 214). As noted above, first flow device 150 directs a flow of fluid in a direction represented by arrow 164, which, in the illustrated embodiment, is acute relative to side 108, as well as acute relative to the plane extending between corner 110 and cutting assembly 126. The timing of the actuations may vary in different embodiments, e.g., with first flow device 150 being actuated either prior to, concurrently with, or after severing of the web with cutting assembly 156, such that a flow of fluid is directed onto packaging material tail 106 while the free end 112 thereof is unsupported.

It should be noted that, as a result of the acute angle at which the flow of fluid is directed, the fluid flow imparts both a force component $F_1$ that urges the packaging material tail 106 toward side 108 of load 102, as well as a force component $F_2$ that resists lengthwise bunching of the tail and opposes the restoring force resulting from severing of the web while under tension by cutting assembly 156.

Next, as illustrated in FIG. 7, second flow device 152 is actuated to direct a flow of fluid in a direction represented by arrows 166 (block 216). Doing so increases adhesion of the packaging material tail to the side of the load, and in this regard, it may be desirable to generate flow in the form of multiple air pulses or blasts, e.g., two air pulses or blasts separated by one or more seconds. It may also be desirable to direct air pulses or blasts at multiple locations across the length and/or width of the packaging material tail to improve adhesion at the multiple locations.

Finally, returning to FIG. 8, once the packaging material tail is adhered or affixed to the side of the load, cutting assembly 156, insertion tool 158 and flow devices 150, 152 may be lowered to their respective storage positions, with apparatus 100 in suitable condition for another wrapping operation to wrap a different load.

Figure 9:
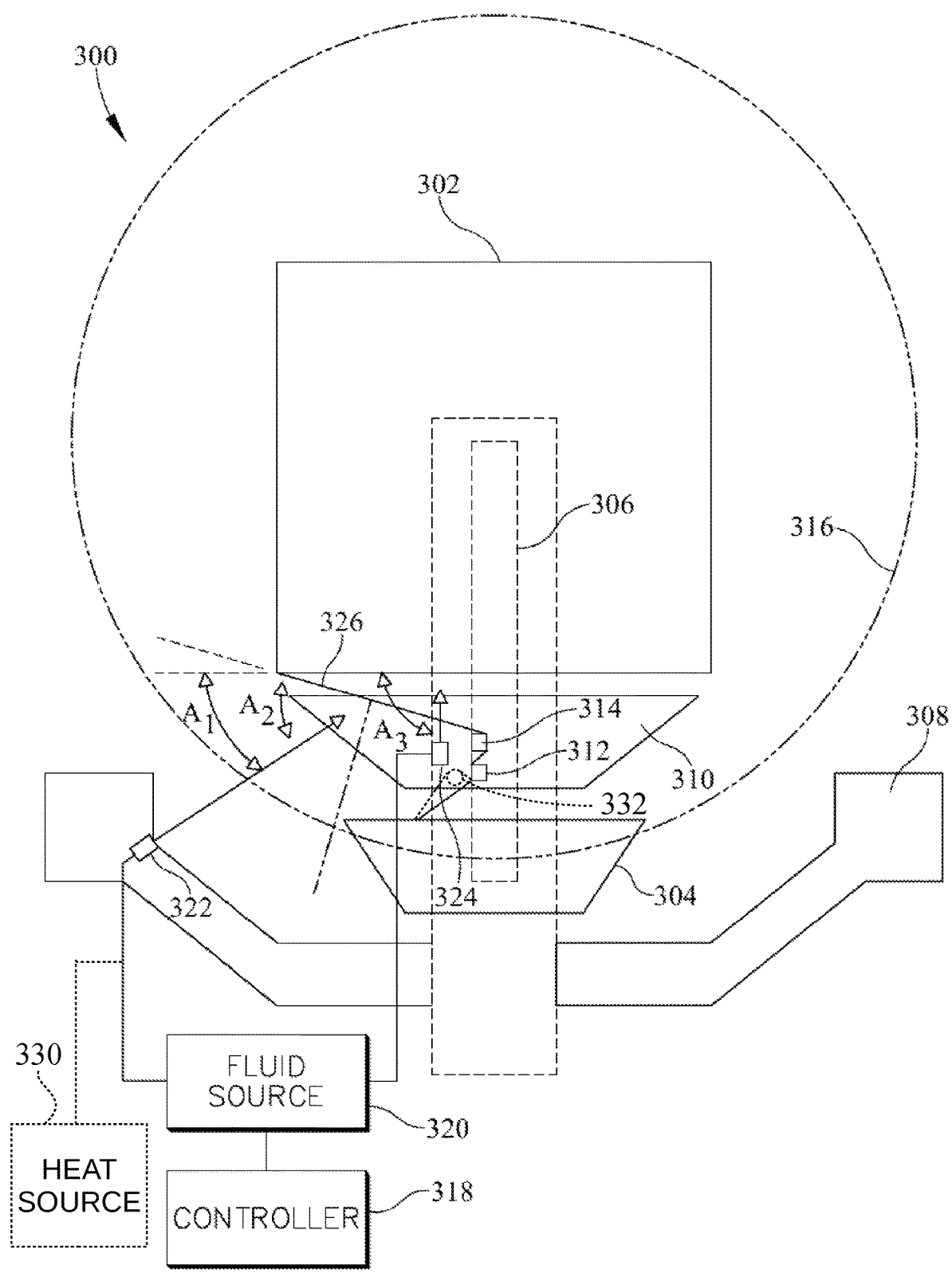
FIG. 9 is a functional top plan view of another wrapping apparatus consistent with the invention, and utilizing an alternate location for a first stage flow device to that illustrated in FIGS. 1-7.

Now turning to FIG. 9, another implementation of a load wrapping apparatus 300 for wrapping a load 302 is shown. Apparatus 300 includes a packaging material dispenser 304 that is supported by a rotating arm 306, which is supported on a base 308. A support assembly 310, similar in some respects to support assembly 120, includes a holder 312 and cutting assembly 314, and a zone of rotation is represented by circle 316.

A controller 318, which is capable of operating the various components of apparatus 300, is coupled to a fluid source 320 that drives first and second flow devices 322, 324. As noted above, each flow device 322, 324 may be positioned in various locations and supported by various structures in different embodiments, and FIG. 9 illustrates one such alternate location for flow device 322, which is outside of zone of rotation 316 and supported on based 322. A flow device may be supported on other portions of apparatus 300, including, for example, other locations on base 308 or even on packaging material dispenser 304. In addition, a flow device may be free standing or supported by other structures, e.g., on a conveyor frame, a turntable frame, etc.

FIG. 9 also illustrates suitable flow directions for flow devices 322, 324. Angle $A_1$, for example, illustrates the direction of flow from flow device 322 relative to the side of load 302, while angle $A_2$ illustrates the direction of flow from flow device 322 relative to a plane 326 extending between a corner of the load and cutting assembly 314, and it will be appreciated that in the example of FIG. 9, both angles $A_1$ and $A_2$ are acute. Similarly, for flow device 324, $A_3$ illustrates a direction of flow that is relative to the side of the load, and that, in this example, is substantially orthogonal to the side of the load. Other locations and directions may be used in other embodiments.

As also mentioned above, in other embodiments, only a single stage operation may be used, e.g., to perform a first stage operation as described herein from any of the various positions and/or directions described herein (e.g., using either of the positions of flow device 150 or flow device 322). As such, in some embodiments, flow device 324 may be omitted. Moreover, in some embodiments, a single stage operation may be followed by mechanically contacting the packaging material tail to press the packaging material tail against the side of the load to increase the adhesion of the packaging material tail thereto, and as such, flow device 324 may be replaced with a finger, a pad, a brush, etc.

In still other embodiments, it may be desirable to heat at least a portion of the packaging material tail prior to contact with the side of the load to further improve adherence of the packaging material tail. In some embodiments, the heat may be supplied to the packaging material from one or more of the fluid flows, e.g., using a fluid source 320 including an integrated heat source capable of providing a heated fluid, or by injecting heated air into one or more of the fluid flows, e.g., using an optional heat source 330 that is separate from the fluid source 320 as illustrated in FIG. 9. The optional heat source 330 in some embodiments may provide heated fluid that is combined with the fluid from fluid source 320, while in other embodiments optional heat source 330 may heat fluid from fluid source 320 prior to the fluid being supplied to a flow device 322, 324.

In still other embodiments, the heat may be supplied to the packaging material via direct contact, e.g., via a roller or other surface over which the packaging material passes. FIG. 9, for example, illustrates an optional heated roller 332 that may be permanently in contact with the web of packaging material in some embodiments (and optionally activated only at the end of a wrapping operation). In other embodiments, however, the heated roller may selectively engage the packaging material web at the end of a wrapping operation, e.g., by tilting or moving upward into the path of a packaging material web from a storage position similar to holder 312 and cutting assembly 314 of support assembly 310 such that the packaging material web portion corresponding to the tail is passed over the heated roller 332 prior to being severed by cutting assembly 314 and contacting the side of the load.

Regardless of whether fluid-based heating and/or direct contract-based heating is used, however, the application of heat at the end of a wrapping operation may increase the adherence of the packaging material tail to the side of the load in some embodiments of the invention. It will be appreciated, however, that the use of heat is optional, and may not be utilized in other embodiments.

Controller 318 in the embodiment illustrated in FIG. 9 is a local controller that is physically co-located with the various components illustrated in the figure. Controller 318 may include hardware components and/or software program code that allow it to receive, process, and transmit data. It is contemplated that controller 318 may be implemented as a programmable logic controller (PLC), or may otherwise operate similar to a processor in a computer system. Controller 318 may communicate with an operator interface, which may include a display or screen and controls that provide an operator with a way to monitor, program, and operate apparatus 300. For the purposes of the invention, controller 318 may represent practically any type of computer, computer system, controller, logic controller, or other programmable electronic device, and may in some embodiments be implemented using one or more networked computers or other electronic devices, whether located locally or remotely with respect to the various components illustrated in FIG. 9. Controller 318 typically includes a central processing unit including at least one microprocessor coupled to a memory, which may represent the random access memory (RAM) devices comprising the main storage of controller 318, as well as any supplemental levels of memory, e.g., cache memories, non-volatile or backup memories (e.g., programmable or flash memories), read-only memories, etc. In addition, the memory may be considered to include memory storage physically located elsewhere in controller 318, e.g., any cache memory in a processor, as well as any storage capacity used as a virtual memory, e.g., as stored on a mass storage device or on another computer or electronic device coupled to controller 318. Controller 318 may also include one or more mass storage devices, e.g., a floppy or other removable disk drive, a hard disk drive, a direct access storage device (DASD), an optical drive (e.g., a CD drive, a DVD drive, etc.), and/or a tape drive, among others. Furthermore, controller 318 may include an interface with one or more networks (e.g., a LAN, a WAN, a wireless network, and/or the Internet, among others) to permit the communication of information to the components in apparatus 300 as well as with other computers and electronic devices, e.g., computers such as a desktop computer or laptop computer, mobile devices, multi-user computers such as servers or cloud resources, etc. Controller 318 operates under the control of an operating system, kernel and/or firmware and executes or otherwise relies upon various computer software applications, components, programs, objects, modules, data structures, etc. Moreover, various applications, components, programs, objects, modules, etc. may also execute on one or more processors in another computer coupled to controller 318, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning controllers, computers and computer systems, those skilled in the art will appreciate that the various embodiments of the invention are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium that can be used to store the desired information and which can be accessed by controller 318. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Controller 318 for the purposes of this example is assumed to be incorporated wholly within components that are local to wrapping apparatus 300. It will be appreciated, however, that in other embodiments, at least a portion of the functionality incorporated into a wrapping apparatus may be implemented in hardware and/or software that is external to the aforementioned components. For example, in some embodiments, some user interaction may be performed using an external device such as a networked computer or mobile device, with the external device converting user or other input into control variables that are used to control a wrapping operation. In other embodiments, user interaction may be implemented using a web-type interface, and the conversion of user input may be performed by a server or a local controller for the wrapping apparatus, and thus external to a networked computer or mobile device. In still other embodiments, a central server may be coupled to multiple wrapping stations to control the wrapping of loads at the different stations. As such, the operations described herein may be implemented by various local and/or remote components and combinations thereof in different embodiments.

Other embodiments will be apparent to those skilled in the art from consideration of the specification and practice of the present invention. Therefore, the invention lies in the claims set forth hereinafter.

What is claimed is:

1. A method of securing a packaging material tail to a side of a wrapped load, the packaging material tail formed by severing a web of packaging material extending between a corner of the load and a cutting assembly, the method comprising:
    directing a first flow of fluid towards the packaging material tail at a first angle relative to the side of the load; and
    directing a second flow of fluid towards the packaging material tail at a second angle relative to the side of the load;
    wherein the first angle is smaller than the second angle; and
    wherein directing the first flow of fluid towards the packaging material tail is performed while a length of the packaging material tail extending from the corner of the load to a free end thereof is unsupported.

2. The method of claim 1, wherein the first angle is an acute angle relative to the side of the load.

3. The method of claim 2, wherein the first angle is an acute angle relative to a plane extending between the corner of the load and the cutting assembly.

4. The method of claim 2, wherein the first angle is less than about 30 degrees relative to the side of the load.

5. The method of claim 1, wherein the second angle is substantially orthogonal relative to the side of the load.

6. The method of claim 1, wherein the first flow of fluid is directed slightly upward from horizontal to compensate for a weight of the packaging material tail when unsupported.

7. The method of claim 1, wherein the first flow of fluid has a rate of about 9 to about 15 miles per hour.

8. The method of claim 7, wherein the first flow of fluid has a rate of about 11 to about 13 miles per hour.

9. The method of claim 1, wherein a cross-section of the first flow of fluid in a plane extending between the corner and the cutting assembly has a height that is less than or equal to a height of the web of packaging material as presented to the cutting assembly.

10. The method of claim 1, wherein a cross-section of the first flow of fluid in a plane extending between the corner and the cutting assembly has a height that is less than about 18 inches.

11. The method of claim 1, wherein a cross-section of the first flow of fluid in a plane extending between the corner and the cutting assembly has a width that is about 12 inches to about 14 inches to accommodate loads of differing dimensions.

12. The method of claim 1, wherein directing the first flow of fluid towards the packaging material tail is performed before directing the second flow of fluid towards the packaging material tail.

13. The method of claim 12, wherein directing the first flow of fluid towards the packaging material tail is performed before severing the web of packaging material.

14. The method of claim 12, wherein directing the first flow of fluid towards the packaging material tail is performed concurrently with severing the web of packaging material.

15. The method of claim 12, wherein directing the first flow of fluid towards the packaging material tail is performed after severing the web of packaging material.

16. The method of claim 12, wherein directing the first flow of fluid towards the packaging material tail causes the packaging material tail to come into contact with the side of the load.

17. The method of claim 16, wherein directing the first flow of fluid towards the packaging material tail reduces bunching of the packaging material tail widthwise and/or lengthwise prior to coming into contact with the side of the load.

18. The method of claim 16, wherein directing the second flow of fluid towards the packaging material tail increases adherence of the packaging material tail to the side of the load.

19. The method of claim 16, wherein directing the second flow of fluid towards the packaging material tail is performed after the packaging material tail comes into contact with the side of the load.

20. The method of claim 16, wherein directing the second flow of fluid towards the packaging material tail is performed before the packaging material tail comes into contact with the side of the load.

21. The method of claim 16, wherein directing the second flow of fluid towards the packaging material tail is performed concurrently with the packaging material tail coming into contact with the side of the load.

22. The method of claim 1, wherein directing the second flow of fluid towards the packaging material tail includes directing a plurality of pulsed flows of fluid towards the packaging material tail.

23. The method of claim 22, wherein the plurality of pulsed flows of fluid impact the packaging material tail at a plurality of locations across a width of the packaging material tail.

24. The method of claim 1, wherein the first flow of fluid has a lower velocity than the second flow of fluid.

25. The method of claim 1, wherein the first flow of fluid has a higher volume than the second flow of fluid.

26. The method of claim 1, wherein the first flow of fluid has a longer duration than the second flow of fluid.

27. The method of claim 1, wherein directing the first flow of fluid towards the packaging material tail is performed from a first position generally upstream of a free end of the packaging material tail and directing the second flow of fluid towards the packaging material tail is performed from a second position that is different from the first position.

28. The method of claim 27, wherein the first position is farther from the side of the load than the second position.

29. The method of claim 1, wherein directing the second flow of fluid towards the packaging material tail is performed using one or more nozzles coupled to a source of pressurized fluid.

30. The method of claim 29, wherein the one or more nozzles are rotatably supported by a support assembly that is at least partially inside of a zone of rotation for a packaging material dispenser that rotates about the load to rotate between a substantially horizontal storage position and a substantially vertical operating position.

31. The method of claim 1, wherein directing the first flow of fluid towards the packaging material tail is performed using one or more nozzles coupled to a source of pressurized fluid.

32. The method of claim 31, wherein the one or more nozzles are rotatably supported by a support assembly that is at least partially inside of a zone of rotation for a packaging material dispenser that rotates about the load to rotate between a substantially horizontal storage position and a substantially vertical operating position.

33. The method of claim 31, wherein the one or more nozzles are disposed outside of a zone of rotation for a packaging material dispenser that rotates about the load.

34. The method of claim 33, wherein the one or more nozzles are supported by the packaging material dispenser.

35. The method of claim 1, further comprising:
prior to directing the first and second flows of fluid towards the packaging material tail, engaging the web of packaging material with a packaging material holder disposed downstream of the cutting assembly; and
severing the web of packaging material with the cutting assembly while the web of packaging material is engaged by the packaging material holder.

36. The method of claim 35, wherein the packaging material holder includes:
first and second opposing jaws having an opening therebetween for receiving the web of packaging material; and
at least one inflatable element disposed between the first and second opposing jaws and convertible between a first, unpressurized condition defining a gap within the opening, and a second, pressurized condition closing the gap to thereby clamp the web of packaging material in the opening when the packaging material is received in the opening;
wherein engaging the web of packaging material with the packaging material holder further includes inserting an insertion tool into the opening between the first and second opposing jaws to urge the web of packaging material into the opening; and
wherein the method further comprises, prior to directing the first and second flows of fluid towards the packaging material tail:
moving the packaging material holder to a first position adjacent the side of the load while the packaging material holder engages a leading end of the web of packaging material;
wrapping the load while the packaging material holder is in the first position by generating relative rotation between a packaging material dispenser and the load about a center of rotation, wherein wrapping the load at least partially wraps packaging material over the packaging material holder; and
after wrapping the load, disengaging the packaging material holder from the web of packaging material and moving the packaging material holder to a second position and away from the side of the load;
wherein engaging the web of packaging material with the packaging material holder, inserting the insertion tool into the opening and severing the web of packaging material with the cutting assembly are performed when the packaging material holder is in the second position and after the packaging material holder is disengaged from the web of packaging material.

37. The method of claim 36, wherein the packaging material holder is mounted to a support arm configured to rotate about a substantially vertical axis, wherein the packaging material holder is movable between the first and second positions via rotation of the support arm about the substantially vertical axis, and wherein the cutting assembly and the insertion tool are rotatably supported by a support assembly that is at least partially inside of a zone of rotation for the packaging material dispenser to rotate between respective substantially horizontal storage positions and respective substantially vertical operating positions.

38. A method of securing a packaging material tail to a side of a wrapped load, the method comprising:
    severing a web of packaging material extending between a corner of the load and a cutting assembly to form a packaging material tail extending from the corner of the load;
    directing a first flow of fluid towards the packaging material tail from a first position generally upstream of a free end of the packaging material tail and at a first angle relative to the side of the load while a length of the packaging material tail extending from the corner of the load to the free end of the packaging material tail is unsupported to cause the packaging material tail to come into contact with the side of the load; and
    after directing the first flow of fluid towards the packaging material tail, directing a second flow of fluid towards the packaging material tail from a second position and at a second angle relative to the side of the load to increase adherence of the packaging material tail to the side of the load;
    wherein the first angle is an acute angle relative to the side of the load and the second angle is substantially orthogonal relative to the side of the load.

39. A method of securing a packaging material tail to a side of a wrapped load, the method comprising:
    severing a web of packaging material extending between a corner of the load and a cutting assembly to form a packaging material tail extending from the corner of the load; and
    with a flow device, directing a flow of fluid towards the packaging material tail from a position generally upstream of a free end of the packaging material tail and at an acute angle relative to the side of the load while a length of the packaging material tail extending from the corner of the load to the free end of the packaging material tail is unsupported to cause the packaging material tail to come into contact with the side of the load, wherein at least a portion of the flow device is supported by a support assembly that is at least partially inside of a zone of rotation for a packaging material dispenser to move between a storage position and an operating position.

40. The method of claim 39, wherein the flow of fluid is a first flow of fluid, the position is a first position and the acute angle is a first angle, the method further comprising, after directing the first flow of fluid towards the packaging material tail, directing a second flow of fluid towards the packaging material tail from a second position and at a second angle relative to the side of the load to increase adherence of the packaging material tail to the side of the load, wherein the second angle is substantially orthogonal relative to the side of the load.

41. The method of claim 39, wherein the flow of fluid is further directed at an acute angle relative to a plane extending between the corner of the load and the cutting assembly.

42. The method of claim 39, wherein the angle is less than about 45 degrees relative to the side of the load.

43. The method of claim 42, wherein the angle is less than about 30 degrees relative to the side of the load.

* * * * *